United States Patent [19]
Hodson et al.

[11] Patent Number: 5,760,858
[45] Date of Patent: Jun. 2, 1998

[54] FIELD EMISSION DEVICE PANEL BACKLIGHT FOR LIQUID CRYSTAL DISPLAYS

[75] Inventors: Lester Hodson, McKinney; Charles E. Primm, Plano, both of Tex.

[73] Assignee: Texas Instruments Incorporated, Dallas, Tex.

[21] Appl. No.: 426,307

[22] Filed: Apr. 21, 1995

[51] Int. Cl.$^6$ .................................. G02F 1/1335
[52] U.S. Cl. ............................. 349/61; 349/69
[58] Field of Search ............. 359/50, 48; 349/61, 349/69, 70

[56] References Cited

U.S. PATENT DOCUMENTS

| | | | |
|---|---|---|---|
| 3,755,704 | 8/1973 | Spindt et al. | 313/309 |
| 4,793,691 | 12/1988 | Enomoto et al. | 359/50 |
| 4,857,799 | 8/1989 | Spindt et al. | 313/495 |
| 4,940,916 | 7/1990 | Borel et al. | 313/306 |
| 5,121,233 | 6/1992 | Spencer et al. | 359/50 |
| 5,146,355 | 9/1992 | Prince et al. | 359/50 |
| 5,194,780 | 3/1993 | Meyer | 315/169.3 |
| 5,225,820 | 7/1993 | Clerc | 340/752 |
| 5,504,597 | 4/1996 | Sprague et al. | 359/40 |

FOREIGN PATENT DOCUMENTS 4-6521  1/1992  Japan .................. 359/50

OTHER PUBLICATIONS

*Solid State Technology*, O'Mara, William C. "Active Matrix Liquid Crystal Displays Part 1: Manufacturing Process." pp. 65–70, Dec., 1991.

*Primary Examiner*—William L. Sikes
*Assistant Examiner*—Charles Miller
*Attorney, Agent, or Firm*—Rose Alyssa Keagy; Richard L. Donaldson; W. James Brady

[57] ABSTRACT

A liquid crystal display system has a first translucent sheet 20 having at least one pixel electrode 43 driven by a transistor 26, and a second translucent sheet 22 having a common electrode 32. The first and second sheets 20 and 22 are sandwiched about liquid crystal molecules 24 for controlling the passage of light. A field emission device (FED) light source 70 is adjacent to the pixel electrode 43, the FED light source 70 having an emitter plate 75 coupled to an anode plate 73. The FED light source 70 replaces the CCFT 54, reflector diffuser 60, metal sheet 62, and reflector sheet 56 used in prior art LCD systems.

8 Claims, 5 Drawing Sheets

FIELD EMISSION DEVICE PANEL BACKLIGHT FOR LIQUID CRYSTAL DISPLAYS

TECHNICAL FIELD OF THE INVENTION

The present invention relates generally to illumination devices and, more particularly, to the integration of field emission devices ("FED") into liquid crystal displays ("LCD").

BACKGROUND OF THE INVENTION

The phenomenon of field emission was discovered in the 1950's, and extensive research by many individuals, such as Charles A. Spindt of SRI International, has improved the technology to the extent that its prospects for use in the manufacture of inexpensive, low-power, high-resolution, high-contrast, full-color flat displays appear to be promising. Advances in field emission display technology are disclosed in U.S. Pat. No. 3,755,704, "Field Emission Cathode Structures and Devices Utilizing Such Structures," issued 28 Aug. 1973, to C. A. Spindt et al.; U.S. Pat. No. 4,940,916, "Electron Source with Micropoint Emissive Cathodes and Display Means by Cathodoluminescence Excited by Field Emission Using Said Source," issued 10 Jul. 1990 to Michel Borel et al.; U.S. Pat. No. 5,194,780, "Electron Source with Microtip Emissive Cathodes," issued 16 Mar. 1993 to Robert Meyer; and U.S. Pat. No. 5,225,820, "Microtip Trichromatic Fluorescent Screen," issued 6 Jul. 1993, to Jean-Frédéric Clerc. These patents are incorporated by reference into the present application.

A FED flat panel display arrangement is disclosed in U.S. Pat. No. 4,857,799, "Matrix-Addressed Flat Panel Display," issued Aug. 15, 1989, to Charles A. Spindt et al., incorporated herein by reference. This arrangement includes a matrix array of individually addressable light generating means of the cathodoluminescent type having electron emitting cathodes combined with an anode which is a luminescing means of the CRT type which reacts to electron bombardment by emitting visible light. Each cathode is itself an array of thin film field emission cathodes on a backing plate, and the luminescing means is provided as a phosphor coating on a transparent face plate which is closely spaced to the cathodes.

The emitter backing plate disclosed in the Spindt et al. ('799) patent includes a large number of vertical conductive cathode electrodes which are mutually parallel and extend across the backing plate and are individually addressable. Each backing plate includes a multiplicity of spaced-apart electron emitting tips which project upwardly from the vertical cathode electrodes on the backing plate and therefore extend perpendicularly away from the backing plate. An electrically conductive gate electrode arrangement is positioned adjacent to the tips to generate and control the electron emission. The gate electrode arrangement comprises a large number of individually addressable, horizontal electrode stripes which are mutually parallel and extend along the backing plate orthogonal to the cathode electrodes, and which include apertures through which emitted electrons may pass. Each gate electrode is common to a full row of pixels extending across the front face of the backing plate and is electrically isolated from the arrangement of cathode electrodes. The emitter back plate and the anode face plate are parallel and spaced apart.

The array of emitting tips are activated by addressing the orthogonally related cathode gate electrodes in a generally conventional matrix-addressing scheme. The appropriate cathode electrodes of the display along a selected stripe, such as along one column, are energized while the remaining cathode electrodes are not energized. Gate electrodes of a selected stripe orthogonal to the selected cathode electrode are also energized while the remaining gate electrodes are not energized, with the result that the emitting tips of a pixel at the intersection of the selected cathode and gate electrodes will be simultaneously energized, emitting electrons so as to provide the desired pixel display.

The anode is a thin film of an electrically conductive transparent material, such as indium tin oxide, which covers the interior surface of the face plate. Deposited onto this metal layer is a luminescent material, such as phosphor, that emits light when bombarded by electrons.

Today, a (conventional FED is manufactured by combining the teachings of many practitioners, including the teachings of the Spindt et al. ('799) and Clerc ('820) patents. Referring initially to FIG. 1, there is shown, in cross-sectional view, a portion of an illustrative field emission device. In this embodiment, the field emission device comprises an anode plate 1 having an electroluminescent phosphor coating 3 facing an emitter plate 2, the phosphor coating 3 being observed from the side opposite to its excitation.

More specifically, the field emission device of FIG. 1 comprises a cathodoluminescent anode plate 1 and an electron emitter (or cathode) plate 2. A cathode portion of emitter plate 2 includes cathode electrode conductors 9 formed on an insulating substrate 10, an electrically resistive layer 8 which is formed on substrate 10 and overlaying the conductors 9, and a multiplicity of electrically conductive microtips 5 formed on the resistive layer 8. In this example, the conductors 9 comprise a mesh structure, and microtip emitters 5 are configured as a matrix within the mesh spacings. Microtips 5 take the shape of cones which are formed within apertures through conductive layer 6 and insulating layer 7.

A gate electrode comprises a layer of an electrically conductive material 6 which is deposited on an insulating layer 7. The thicknesses of gate electrode layer 6 and insulating layer 7 are chosen in such a way that the apex of each microtip 5 is substantially level with the electrically conductive gate electrode layer 6. Conductive layer 6 may cover the entire surface of insulating layer 7; alternatively, it may comprise conductive bands covering portions of insulating layer 7.

Anode plate 1 comprises a transparent, electrically conductive film 12 deposited on a transparent planar support 13, which is positioned facing gate electrode 6 and parallel thereto, the conductive film 12 being deposited on the surface of support 13 directly facing gate electrode 6. Conductive film 12 may be in the form of a continuous layer across the surface of support 13; alternatively, it may be in the form of electrically isolated stripes comprising three series of parallel conductive bands across the surface of support 13, as shown in FIG. 1 and as taught in U.S. Pat. No. 5,225,820, to Clerc. By way of example, a suitable material for use as conductive film 12 may be indium-tin-oxide (ITO), which is optically transparent and electrically conductive. Anode plate 1 also comprises a cathodoluminescent phosphor coating 3, deposited over conductive film 12 so as to be directly facing and immediately adjacent gate electrode 6. In the Clerc patent, the conductive bands of each series are covered with a particulate phosphor coating which luminesces in one of the three primary colors, red, blue and green $3_R$, $3_B$, $3_G$. Typically, the width of anode stripes 74 is 70 μm and the spacing between color stripes 74 is 30 μm. Therefore the pitch of one set of red, green, and blue stripes is 300 μm.

Selected groupings of microtip emitters 5 of the above-described structure are energized by applying a negative potential to cathode electrode 9 relative to the gate electrode 6, via voltage supply 19, thereby inducing an electric field which draws electrons from the apexes of microtips 5. The potential between cathode electrode 9 and gate electrode 6 is approximately 70–100 volts. The freed electrons are accelerated toward the anode plate 1 which is positively biased by the application of a substantially larger positive voltage from voltage supply 11 coupled between the cathode electrode 9 and conductive band 12 functioning as the anode electrode. The potential between cathode electrode 9 and anode electrode 12 is approximately 300–800 volts. Energy from the electrons attracted to the anode conductive band 12 is transferred to particles of the phosphor coating 3, resulting in luminescence. The electron charge is transferred from phosphor coating 3 to conductive film 12, completing the electrical circuit to voltage supply 11. The image created by the phosphor stripes is observed from the anode side which is opposite to the phosphor excitation, as indicated in FIG. 1.

In applications where the FED is operated at an increased luminance, the distance between anode 1 and cathode 2 is increased from approximately 200 μ to approximately 400 μ and a focusing grid 18 is usually placed between the anode 1 and cathode 2 as shown in FIG. 1. The focusing grid 18, which is commonly known in the art, is a thin conductive film containing numerous perforations. The focusing grid 18 acts to direct the flow of electrons between the pixel arrays 4 and color stripes 3.

It is to be noted and understood that true scaling information is not intended to be conveyed by the relative sizes and positioning of the elements of anode plate 1 and the elements of emitter plate 2 as depicted in FIG. 1. For example, in a typical display FED shown in FIG. 1 there are approximately one hundred ten arrays 4 of microtips per pixel; each array 4 containing 16 microtips. In addition, there are three color stripes $3_R$, $3_B$, $3_G$ per display pixel.

Thin-film transistor liquid-crystal displays (TFT-LCD) are widely used in the portable flat panel display market. The foundation of these displays are liquid crystal cells which are made of twisted rod-like molecules forming a dielectric between a TFT plate and a color-filter plate. In the normal, unperturbed state, light passes freely through the translucent cell. When voltage is applied across the gap, the molecules twist, blocking polarized light and turning the pixel black. Gray-scale values are obtained by varying the voltage across the cell and thus the degree of twist in the liquid crystal. Colors are obtained with discrete filters, so three subpixels of red, green, and blue make up a single pixel able to produce the desired colors.

Active matrix liquid crystal displays (AMLCDs) have the best performance and therefore fast-response liquid crystal can be used. As shown in FIG. 2, AMLCDs are primarily composed of two sheets of glass 20 and 22 with LCD material 24 in between. One sheet of glass 20 contains α-Si TFTs 26 and the other sheet of glass 22 contains color filter 29. In an AMLCD the voltage level at each red, green, and blue sub-pixel is controlled by the TFT 26 and a capacitor 28 connected to the drain of the TFT 26 and fabricated on the sheet of glass 20. Signals are sent to each TFT 26 by the gate bus 34 and drain bus 36 from driver ICs (46, 50, shown in FIG. 3) around the periphery of the display. When the TFT 26 is switched on, it applies a persistent voltage across the capacitor 28. The ITO material comprising the pixel aperture 43 is responsive to the voltage and controls the alignment of the liquid crystal molecules. As a result, the pixel aperture 43 acts as a shutter and allows the correct amount of light to pass through the liquid crystal in order to obtain the desired display image which is viewed by the user.

In FIG. 2 a bright fluorescent light tube 54 located behind the display is the light source. The typical fluorescent light source for a LCD is a Cold Cathode Florescent Tube (CCFT) 54 operating at approximately 2000 cd/m$^2$(nits). In an attempt to capture and redirect potentially lost light from the CCFT 54, a metal reflector sheet 56 with a highly reflective mirror surface is curved around the CCFT 54. An acrylic wedge-shaped reflector-diffuser 60 is used to uniformly distribute the light from the CCFT 54 across the back of the LCD. If the reflector diffuser 60 was not used, the image on the LCD display would have a noticeably uneven luminance, e.g. the display image would have bright spots and dark spots. An additional highly reflective mirrored metal sheet 62 is often utilized to capture and redirect light which is heading away from the LCD. Since liquid crystals can only manipulate polarized light effectively, a diffuser-polarizer 44 is also employed to orient the light in a direction which is perpendicular to the plane of the glass TFT substrate 20.

The second sheet of glass 22 is the color filter plate and it includes the pixel color filters 29, a polarizer 30, and the transparent conducting common electrode comprised of ITO film 32. The color polymer film 29 is a filter which allows the red, green and blue light to pass; thereby creating the color display image.

The LCD alignment is generally achieved by first coating the LC side of each glass plate with a thin polyamide layer 38. Next the polyamide layer is "rubbed" to create tiny grooves and the plates are then aligned. The grooves also help the liquid crystal molecules align at the substrate surface and assume the proper tilt angle. The plates are sealed with sealing adhesive 40 after injecting the LC material 24 between the plates. The LC cell gap is controlled by spacer balls 42 contained in the dispensed LCD material 24. Typical large area flat panel displays have a cell gap of 5 to 10 μm.

Since the light is transmitted through the display, it is important to block as little of it as possible. Therefore, the pixel electrode and interconnect lines are made from indium tin oxide (ITO), which is 70–80% transparent. The TFT's are made as small as possible for the same reason. However, even with these measures, 93–97% of the light is lost to the polarizers, color filters, circuitry, and the liquid crystal itself.

A schematic of an AMLCD-TFT array is shown in FIG. 3. The display cell, 51 is the active LCD display region which is viewed by the LCD user. TFTs 26 acting as switches controlled by the gate electrodes 48 connect the data lines 52 to the pixel ITO aperture (43, FIG. 2). For high density displays, the row-driver chips 46 for the TFT gate lines 48 are usually on one side, while the data-driver chips 50 alternate between upper and lower edges. This design is used because the bonding pad spacings are approaching bonding technology limits. This design is also used to increase the dwell time available for each pixel. This design also facilitates an easier assembly of the drivers to the panel. During LCD operation when the TFT 26 is switched on, it applies a persistent voltage across a capacitor 28 and thereby controls the alignment of the liquid crystal molecules at the location of the pixel ITO aperture 43. The operation of the AMLCD is further detailed in "Active Matrix Liquid Crystal Displays Part I: Manufacturing Process", by William C. O'Mara, from Solid State Technology, dated December 1991, pages 65–70. This article is incorporated by reference into the present application.

There are many problems associated with the use of the color filter in LCDs. First, they must be carefully manufactured so that the color is uniform from one side of the display panel to the other side, as well as uniform within each color cell. At least four photolithographic steps are needed to deposit and pattern the red, green, and blue colors as well as the black border necessary for color contrast.

Another problem with the use of the color filter is that the sputter deposition conditions of the subsequent ITO layer must be carefully regulated to avoid degradation of the color filter performance. Furthermore, since the ITO thin film and liquid crystal alignment polymer layer must be deposited over the filters, at least one intermediate planarizing layer must be deposited over the color filter array, thus adding to the overall LCD product cost.

The use of color filters in LCDs also adds to the complexity of assembly and test and therefore adds to product cost. First, the color filter array must be properly aligned such that each color cell is centered over one pixel ITO aperture 43. If a color cell overlaps onto another pixel ITO aperture 43 region, then the activation of one TFT 26 will cause the illumination of two colors, instead of one color, at that pixel location.

After the alignment and sealing of the plate 22 containing the color filter 29 over the plate 20 containing the TFTs 26, the alignment of the color filter 29 to the TFTs 26 is checked at the test phase of system production. The time and machine cost of these assembly and test steps, as well as the cost of scrapping display panels which fail test due to color filter misalignment, greatly adds to overall LCD product cost.

An important disadvantage of the LCD technology is that only about 3–5% of the light generated by the CCFT is emitted from the display surface. Therefore, even though the CCFT emits 2000 nits, the luminance of the LCD display is about 70 nits. Another important disadvantage of current LCD display technology is that the CCFT single bulb light source consumes 2.6 watts of power. Furthermore, unlike an admissive display where only lit pixels consume power, the large amount of power consumed by the CCFT is constant irrespective of the image displayed on the screen.

There are many other problems associated with the use of CCFTs in LCDs. First, CCFTs consume a lot of power, approximately 2.6 watts. Next, the luminance of CCFTs often decreases significantly after the first 100 hours of usage; this necessitates a readjustment of the LCD. Furthermore, the CCFT emits light in all directions and therefore reflectors must be employed to redirect emitted light to the wedge diffuser. Even with the use of a reflector around the CCFT, emitted light is lost because not all of the light emitted by the CCFT gets directed to the diffuser.

Yet another problem with the use of CCFTs is that they have a limited operating range. At low temperatures (below 0° C.) the breakdown voltage is high and therefore a higher voltage is needed to operate the CCFT. In addition, at both low and high temperatures (below 0° C. and above 70° C.) the CCFT operates at a greatly reduced efficiency and therefore lower luminance. Furthermore, the operation of the CCFT generates a lot of heat which is dispersed throughout the LCD system.

The use of CCFTs causes as much as a 15% variance in luminance uniformity across the CCFT bulb which adds to the LCD display nonuniformity. Also, an LCD image can be difficult to see in bright light such as sunlight. Furthermore, the CCFT emits light with the blue hue which is characteristic of fluorescent gas.

What is needed is a way to increase LCD brightness and increase luminance uniformity across the surface of the LCD display. More ideally, what is also needed is a way to reduce overall LCD power consumption, and eliminate the use of CCFTs and color filters.

SUMMARY OF THE INVENTION

In the broadest aspect, this invention relates to the concept of providing a means for generating light of different colors to the aperture switches of a liquid crystal display. The light generating means is a FED having at least one red phosphorescent stripe, at lease one green phosphorescent stripe, and a least one blue phosphorescent stripe.

In a more limited aspect, this invention relates to a liquid crystal display system comprising a first translucent sheet having an array of pixel electrodes. Each pixel electrode corresponding to a red, a green, and a blue component of a display pixel. The system also comprises a second translucent sheet having a common electrode. The first and second sheet are sandwiched about liquid crystal molecules The liquid crystal molecules are responsive to a potential applied between each of said pixel electrodes and the common electrode for controlling the passage of light therethrough. A light source is adjacent to the first translucent sheet. The light source including a field emission device having an emitter plate coupled to an anode plate. The red phosphorescent stripes of the anode plate luminesce adjacent to the red components of the display pixels. Similarly, the green phosphorescent stripes of the anode plate luminesce adjacent to the green components of the display pixels, and the blue phosphorescent stripes of the anode plate luminesce adjacent to the blue components of the display pixels.

The use of the inventive liquid crystal display system has numerous advantages. The power consumption of the CCFT of a typical 9.5 VGA LCD is 2.6 watts. Conversely, the power consumption of a FED used with the same LCD is under 1.0 watt. The result is a savings in power consumption of more than 60% with the present invention.

In typical LCD systems today, the light which passes from the CCFT to the LCD is non-uniform. Therefore, "hot spots" can be seen when viewing the display image. The use of the FED as a light source facilitates better display luminance uniformity. The result is that the LCD of the present invention has a market competitive advantage over today's LCD systems.

Another significant technical advantage of the present invention is the increased efficiency of the LCD. LCD efficiency is defined as the percentage of light from the backlighting source which is passed through the LCD to the display surface. The efficiency of today's LCD is about 3–5%. Conversely, the efficiency of the LCD of the present invention is increased to approximately 12%. Thus, the efficiency of the LCD of the present invention is over three times greater than the efficiency of prior art LCDs.

BRIEF DESCRIPTION OF THE DRAWINGS

The foregoing features of the present invention may be more fully understood from the following detailed description, read in conjunction with the accompanying drawings, wherein.

DETAILED DESCRIPTION

Figure 4:
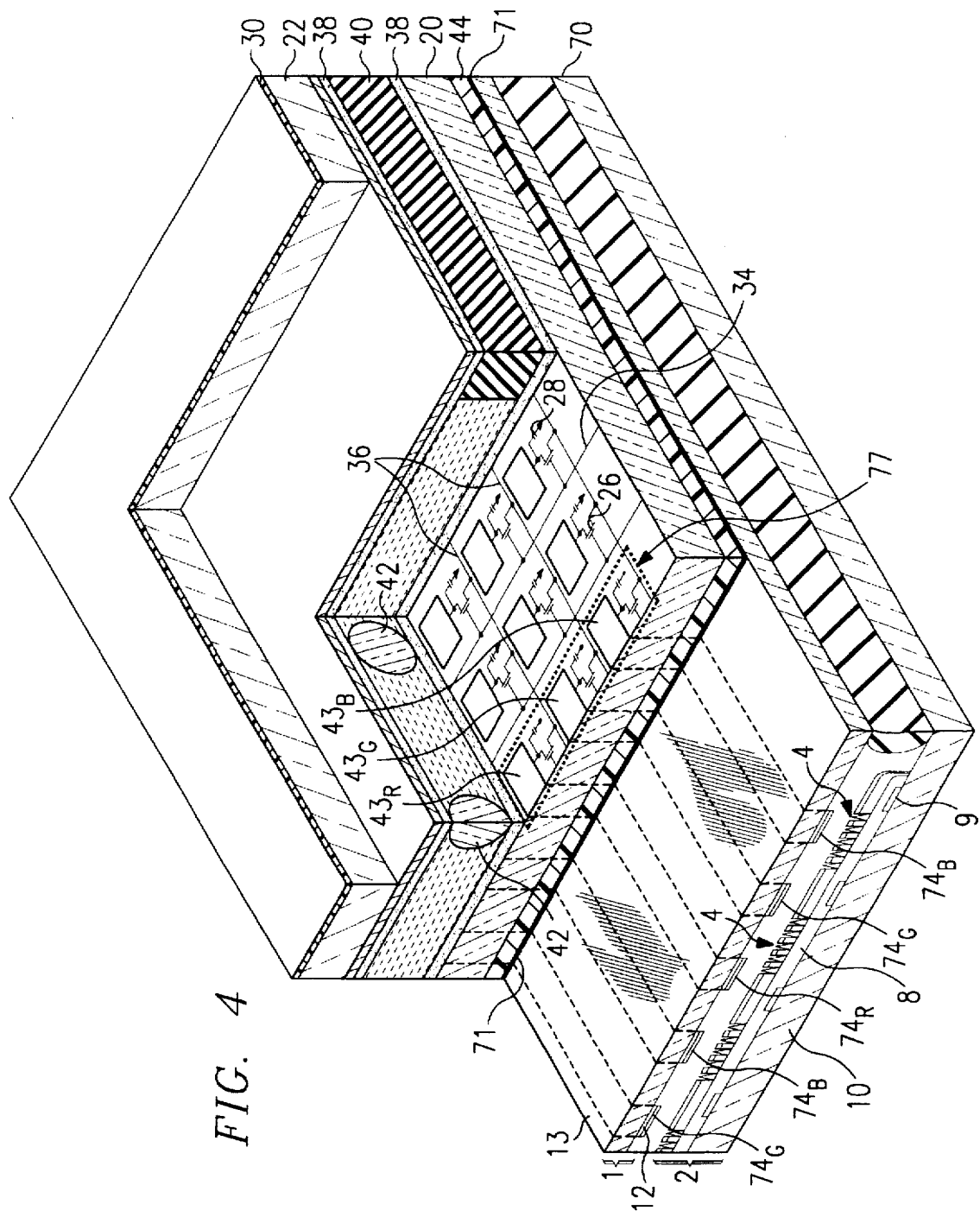
FIG. 4 is a cross sectional view of a portion of a liquid crystal display with a field emission device panel backlight in accordance with the present invention.

FIG. 4 shows a cross sectional view of a portion of a liquid crystal display with a field emission device backlight panel in accordance with the present invention. Unlike the liquid crystal display of FIG. 2, the system of FIG. 4 advantageously replaces the CCFT 54, reflector diffuser 60, metal sheet 62, and reflector sheet 56, which are elements of the backlighting source shown in FIG. 2, with a FED panel 70.

FED 70 is attached to the LCD polarizer 44 by an optical interface 71 such as optical fiber glue. FED 70 is attached to the polarizer 44 such that the anode side of FED 70 is closest to the polarizer 44. The optical interface 71 serves the dual purpose of attaching the FED 70 to the polarizer 44 and matching the indices of refraction between the glass FED 70 and the plastic polarizer 44. Because all of the light from FED 70 is emitted into polarizer 44, the need for the reflector diffuser 60 and for reflectors 56, 62 of FIG. 2 is eliminated.

Figure 2:
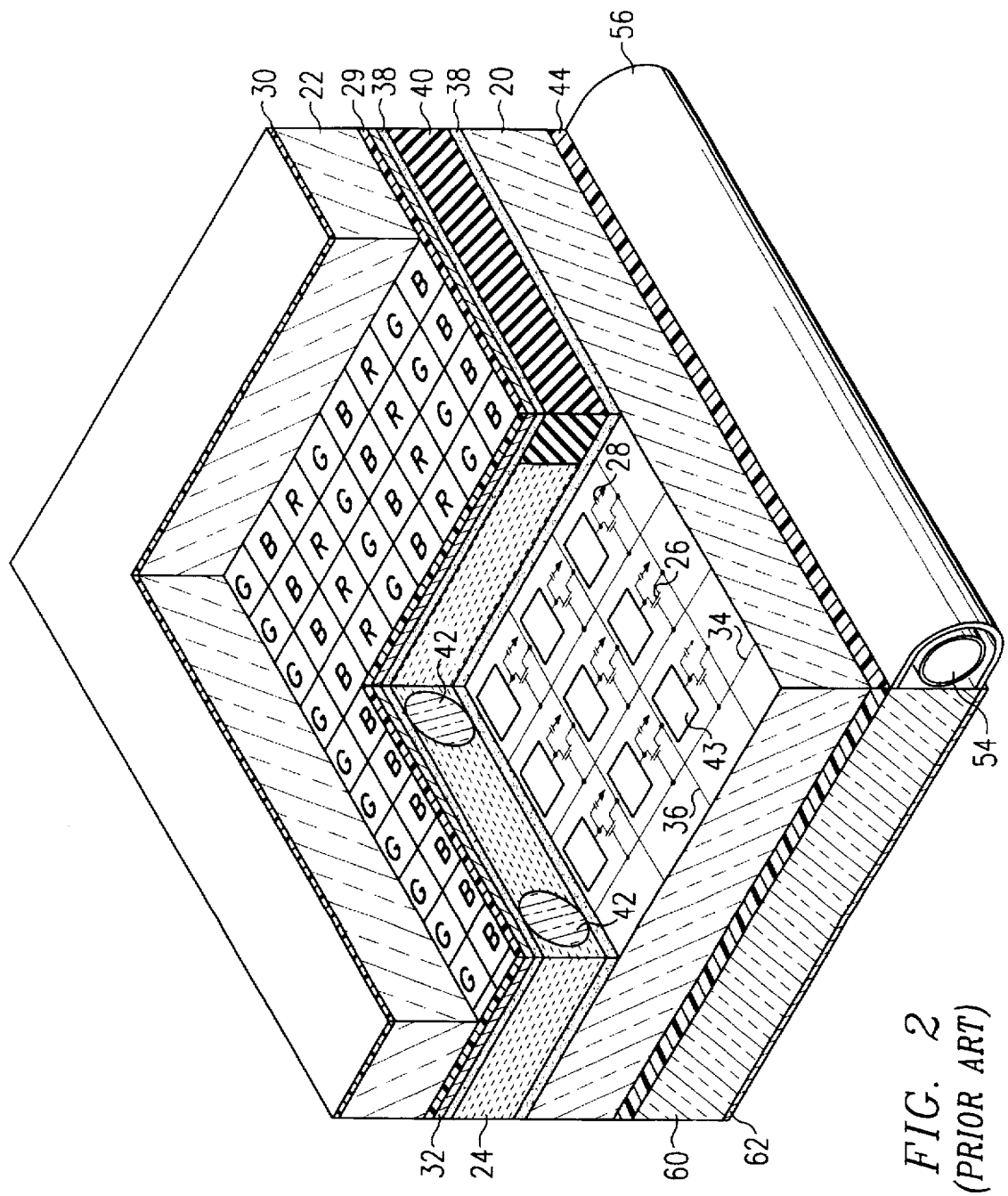
FIG. 2 is a cross-sectional view of a portion of a liquid crystal display according to the prior art.
Figure 3:
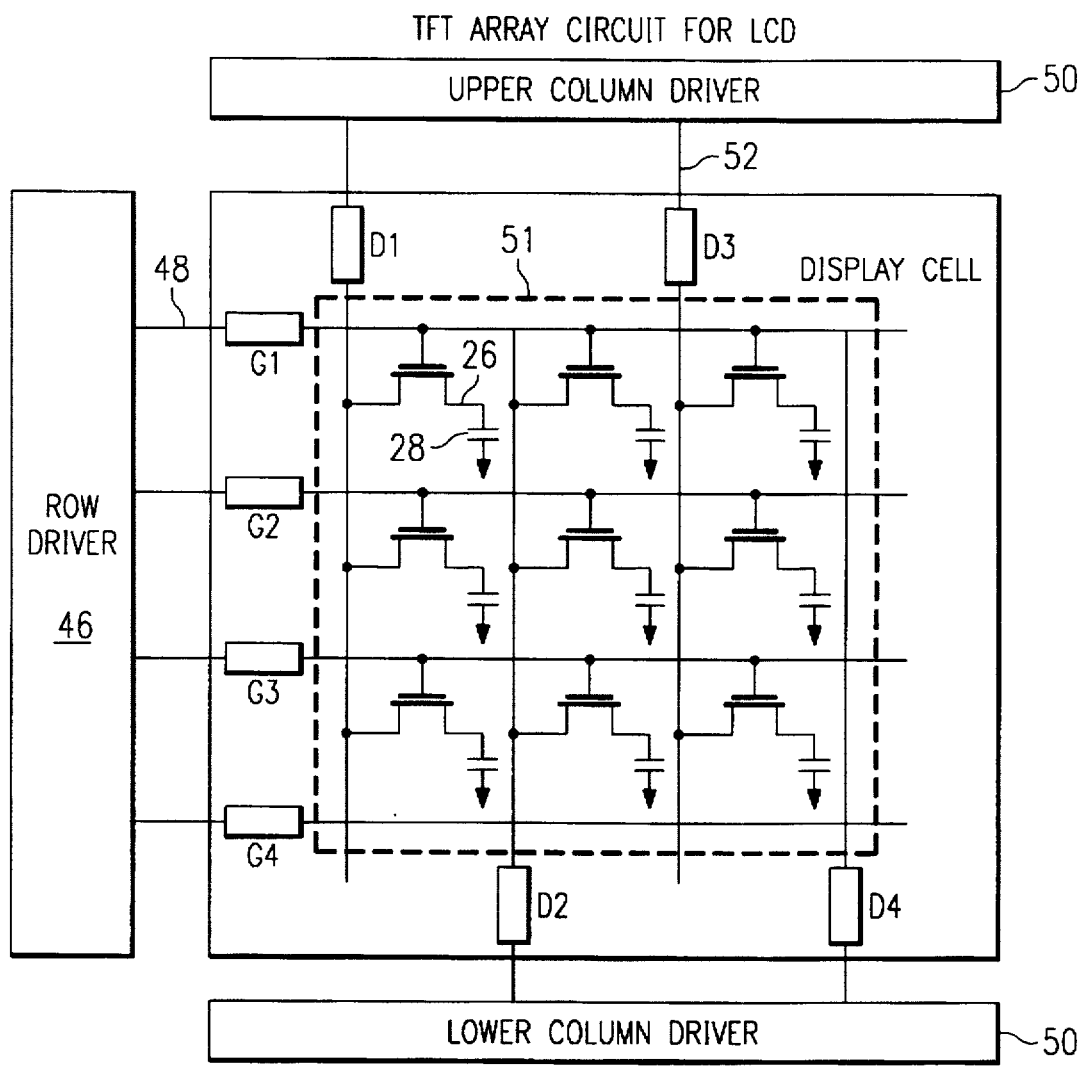
FIG. 3 is a schematic diagram of an AMLCD showing the display cell, driver circuits and their connections according to the prior art.

The LCD of this embodiment operates in a manner substantially similar to the LCD operation illustrated in the prior art FIGS. 2 and 3. A difference between the LCD of the present invention and the prior art LCD is that the backlighting source is a FED instead of a CCFT. The color image displayed by the LCD is created in the standard manner described above: through the manipulation of TFTs 26 through gate lines 48 and data lines 52 in a frame sequential manner. However, the use of color filter 29 is eliminated. Because there are three subpixels per display pixel in this embodiment, the modulation of the TFTs 26 which control each subpixel give enhanced gray scale capability. The TFTs can precisely control gray scale by allowing light to pass during just a fraction of the frame time.

As shown in FIG. 4, each display pixel 77 is comprised of three subpixel apertures 43. The aperture switch $43_R$ controls the passage of red light to the user's eye, the aperture switch $43_G$ controls the passage of the green light to the user's eye, and the aperture switch $43_B$ controls the passage of blue light to the user's eye. The backlight panel FED 70 is aligned with the LCD such that the red phosphor stripe $74_R$ is positionally adjacent and below the aperture for the red component $43_R$ of the display pixel 77. Similarly, the green phosphor stripe $74_G$ is positionally adjacent and below the aperture for the green component $43_G$ of the display pixel 77, and the blue phosphor stripe $74_B$ is positionally adjacent and below the aperture for the green component $43_B$ of the display pixel 77. The alignment of the FED 70 to the LCD can be accomplished using commonly known alignment techniques such as using mask cross-hairs. Because of the alignment of the anode stripes 74 with the apertures 43, red light is passed through the red aperture 43, green light is passed through the green aperture, and blue light is passed through the blue aperture when required in order to create the desired color display.

Figure 1:
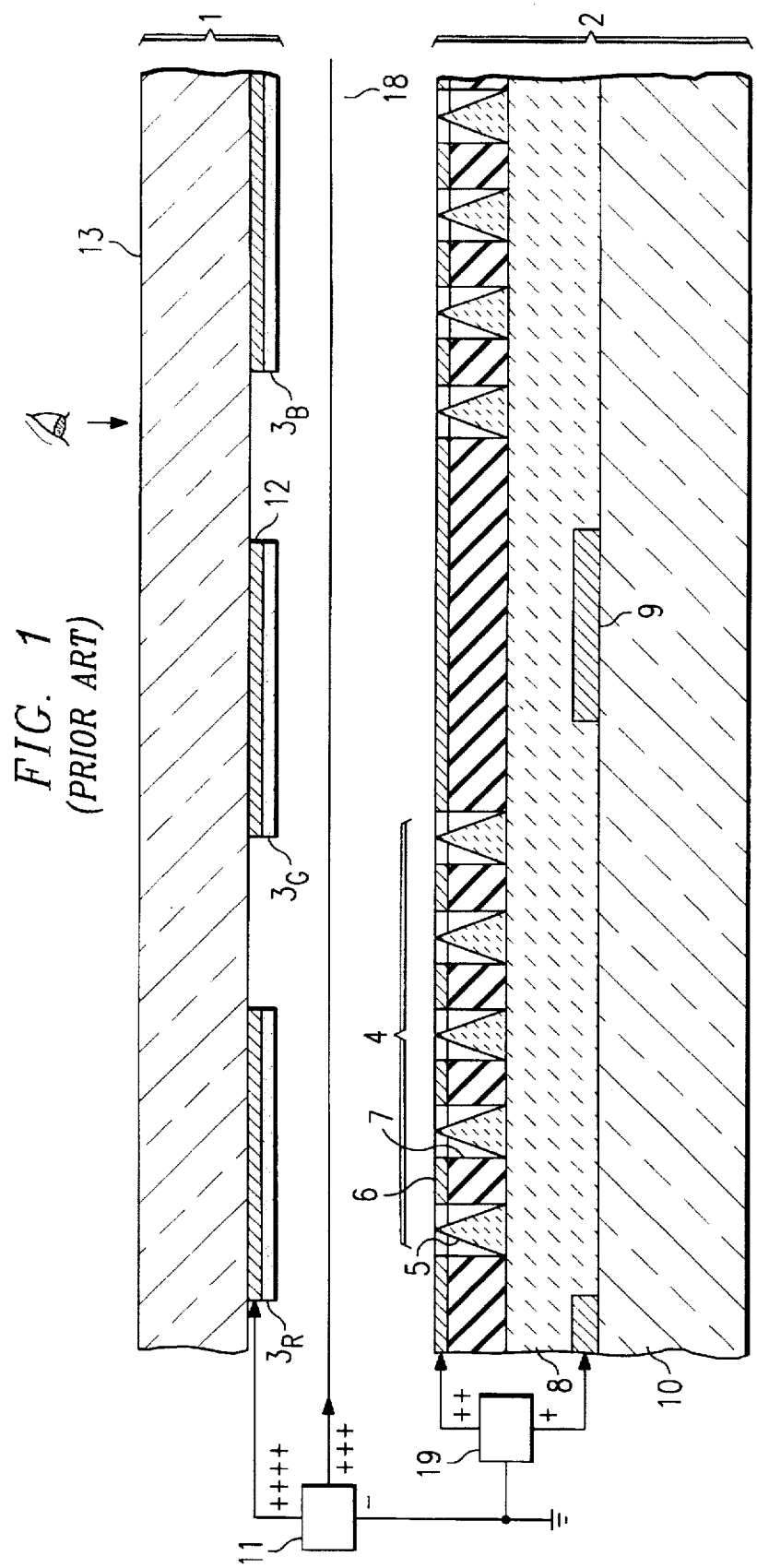
FIG. 1 is a cross-sectional view of a portion of a field emission device according to the prior art.
Figure 5:
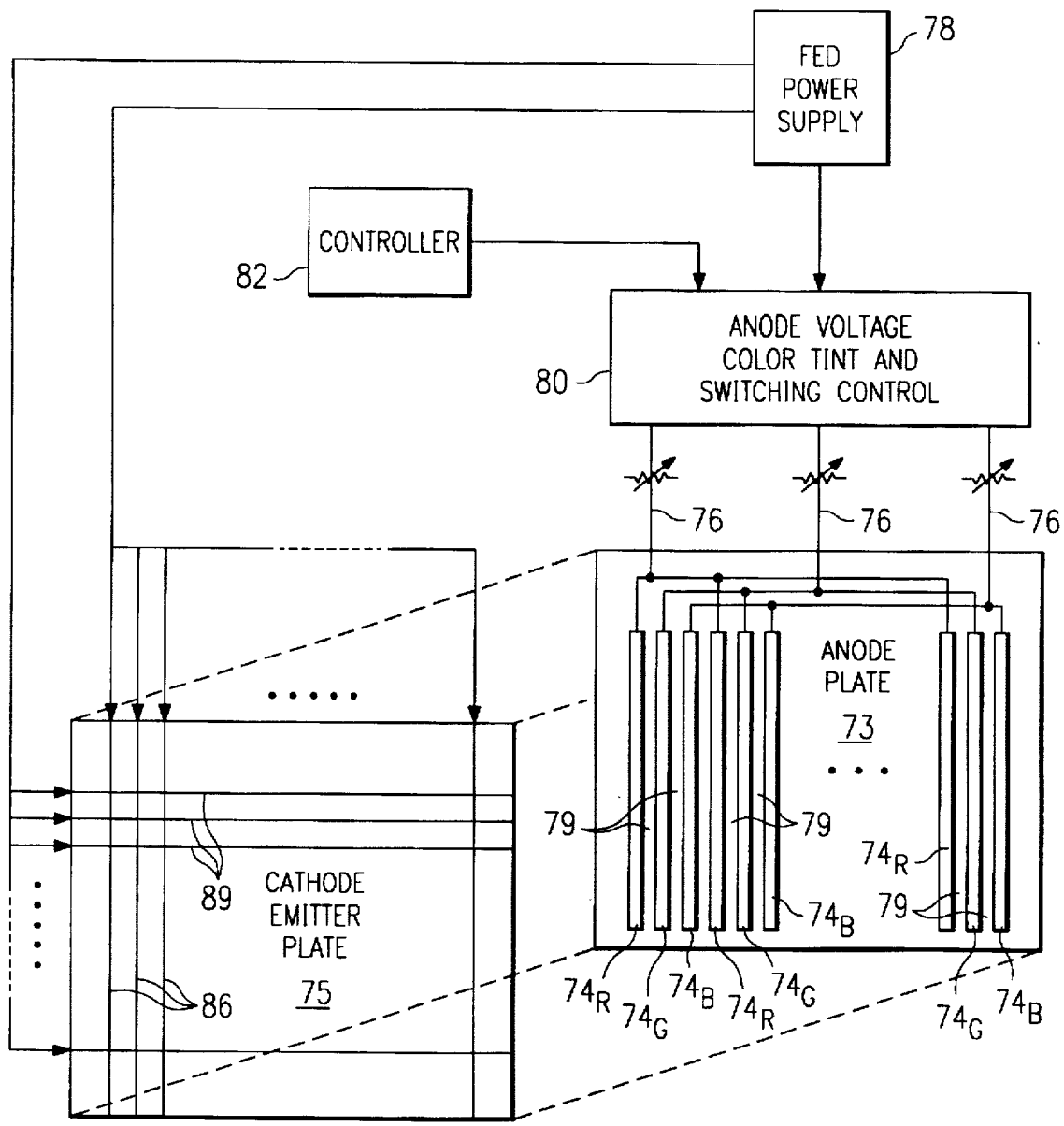
FIG. 5 shows a block diagram of the field emission display electronics of the present invention.

FIG. 5 shows a block diagram of the field emission display electronics of the present invention. The structure of the field emission device 70 in the present invention is substantially similar to the prior art FED shown in FIG. 1. FED 70 includes anode plate 73 coupled to and on top of cathode plate 75. However, the anode plate 73 is illustratively shown separated from cathode plate 75 so that the features of plates 73 and 75 can be more easily seen. The possibility of color wash, which may be caused by light reflected from the anode stripes 74 off of the row electrodes 86 and then through the interstripe spacing 79, can be controlled by the use of a black matrix structure as disclosed in U.S. patent application Ser. No. 08/247.951. "Opaque Insulator For Use on Anode Plate of Flat Panel Display." filed May 24, 1994, assigned to Texas Instruments, and incorporated herein by reference.

A FED power supply 78 provides a high voltage source to an anode color tint and switching control 80 of approximately 500-800 volts. The anode voltage color tint and switching control 80, responsive to commands issued from a controller 82, provides voltages simultaneously to the three anode stripes $74_R$, $74_G$, and $74_B$. Each of the anode stripe voltages 76 is set to a level in accordance with the brightness characteristics of the corresponding luminescent material and is continuously energized.

In addition, the FED power supply 78 provides the ground reference on the column lines 89 of cathode plate 75 of FED 70. Furthermore, the FED power supply 78 provides an adjustable voltage, up to 90 volts, on row lines 86 of cathode plate 75 of FED 70. The cathode plate 75 is substantially similar to cathode plate 2 of prior art FIG. 1. However, as shown in FIG. 5, column lines 89 are tied together, and the row lines 86 are also tied together. The typical number of column lines for a FED display panel is 640 and this is the preferred number of rows in the present invention; however, more or less column lines may be used. The typical number of row lines for a FED display panel is 480 and this is the preferred number of rows in the present invention; however, more or less row lines 86 may be used.

With standard LCDs the typical luminance at the surface of the LCD display panel is 60 nits. In order to provide the same display luminance in the present invention the luminance of FED 70 is increased from the standard luminance of 120 nits to approximately 200 nits. To facilitate the increased luminance, the voltage applied to anode stripes 74 via anode power supply lines 76 must be increased and a focusing grid may be utilized, as stated previously in the discussion regarding FIG. 1. In the present invention the anode 73 receives approximately 1000 volts from anode power supply lines 76, instead of the typical notebook application requirement of 500 to 800 volts.

There are numerous significant technical advantages of the present invention. First, FED 70 is simpler and far less costly to manufacture than the prior art FED shown in FIG. 1. This is because the extra components, such as the row and column drivers needed to operate each column line 89 and each row line 86 independently in the typical FED application, such as the notebook computer, is eliminated.

Furthermore, FED 70 consumes less power than the typical FED because the anode stripes are continuously energized. The typical FED switches power sequentially to the three anode stripes for field sequential color image applications. In applications where power is switched between the anode stripes more power is consumed than in applications where the anode stripes are continuously energized.

Another technical advantage of the present invention is that the LCD manufacturing process is simplified. Eliminating the use of the reflector diffuser 60, metal sheet 62, and reflector sheet 56 results in a lower LCD product cost. The elimination of the color filter 29 in the present embodiment results in at least a 20% cost savings resulting from increased manufacturing yields, reduction in labor and reduction in the cost of materials. This cost savings realized by the present invention has an immense impact on market competitiveness.

In typical LCD systems today, the light which passes from the CCFT to the LCD is non-uniform. Therefore, "hot spots" can be seen when viewing the display image. Because FEDs have a greater luminance uniformity (better than 15%), the use of the FED as a light source facilitates better LCD display luminance uniformity. The result is that the LCD of the present invention has a competitive advantage over today's LCD systems in the marketplace. Another competitive advantage of the present invention is that FEDs have a faster turn on time than CCFTs. The display of LCDs using CCFTs as a backlight are especially slow to turn on in cold environments.

Yet another technical advantage of the present invention is that significant power is saved by using FED 70 instead of CCFT 54 as the backlighting source for the LCD. The power consumption of the CCFT of a typical 9.5 VGA LCD is 2.6 watts. Conversely, the power consumption of a FED used with the same LCD is under 1.0 watt. The result is a savings in power consumption of more than 60% with the present invention.

Similarly, significant power is saved by using FED 70 instead of CCFTs 54 as the backlighting source for the LCD of large display systems. For example, a typical LCD having a 11.4" diagonal display uses two CCFTs in order to adequately illuminate the total display surface. As a result, the total CCFT power consumption of the typical 11.4" LCD is approximately 8 watts. Conversely, the power consumption of a FED used with the same LCD is under 1 watt.

Furthermore, the lower power consumption of the present invention facilitates extended LCD display operation in portable applications. Any power savings in portable applications is very important since portable applications commonly rely on a battery as the sole source of power.

Another significant technical advantage of the present invention is the increased efficiency of the LCD. LCD efficiency is defined as the percentage of light from the backlighting source which is passed through the LCD and emitted from the display surface. The efficiency of today's LCD is about 3–5%. Conversely, the efficiency of the LCD of the present embodiment is increased to approximately 12% due to the elimination of the color filter 29. Thus, the efficiency of the LCD of the present invention is over three times greater than the efficiency of prior art LCDs.

One of the advantages of the increase in efficiency realized by the present invention is that the luminance at the surface of the LCD display is increased, creating brighter and more visible images. In addition, the luminance level of the FED 70 backlight can be reduced from the CCFT luminance level of 2000 nits to around 200 nits while still achieving today's standard of 60 nits luminance level at the surface of the LCD display. The impact of this efficiency increase is that the overall power consumption of the LCD is reduced.

Several other variations of the above would be understood by one skilled in the art and are considered to be within the scope of the present invention. For example, instead of using red, green, and blue phosphorescents to create color images, other phosphor color combinations may be used, such as yellow, cyan, and magenta. Additionally, the LCD may display monochrome images instead of, or in addition to, color images. For example, a mixture of phosphors selected to illuminate in substantially white light could be deposited on all of the anode stripes, thereby creating a black and white monochrome image. Furthermore, instead of using one FED backlight panel 70, multiple FED backlight panels 70 which are placed end to end may be used to provide light to the aperture switches 43.

While the principles of the present invention have been demonstrated with particular regard to the structures and methods disclosed herein, it will be recognized that various departures may be undertaken in the practice of the invention. The scope of the invention is not intended to be limited to the particular structures and methods disclosed herein, but should instead be gauged by the breadth of the claims which follow.

What is claimed is:

1. A liquid crystal display system comprising:
   a first translucent sheet having an array of pixel electrodes; each said pixel electrode corresponding to a red, a green, and a blue component of a display pixel;
   a second translucent sheet having a common electrode;
   said first and second sheet sandwiched about liquid crystal molecules; said liquid crystal molecules responsive to a potential applied between each of said pixel electrodes and said common electrode for controlling the passage of light therethrough;
   a light source adjacent said first translucent sheet; and
   said light source comprising a field emission device having an emitter plate coupled to an anode plate; said anode plate including at least one phosphorescent stripe for luminescing in red, at least one phosphorescent stripe for luminescing in green, and at least one phosphorescent stripe for luminescing in blue;
   wherein said red phosphorescent stripes luminesce adjacent to said red components of said display pixels, said green phosphorescent stripes luminesce adjacent to said green components of said display pixels, and said blue phosphorescent stripes luminesce adjacent to said blue components of said display pixels; and further wherein said phosphorescent stripes are continuously energized during said liquid crustal display operation.

2. The system in accordance with claim 1 wherein said emitter plate includes gate electrodes and cathode electrodes, said gate electrodes of said emitter plate being coupled to a first voltage and said cathode electrodes being coupled to a second voltage.

3. A liquid crystal display system comprising:
   a first translucent sheet having an array of pixel electrodes; each said pixel electrode corresponding to a red, a green, and a blue component of a display pixel;
   a second translucent sheet having a common electrode;
   said first and second sheet sandwiched about liquid crystal molecules; said liquid crystal molecules responsive to a potential applied between each of said pixel electrodes and said common electrode for controlling the passage of light therethrough;
   means for providing light adjacent said first translucent sheet; and
   said light providing means comprising a field emission device having an emitter plate coupled to an anode plate; said anode plate including at least one phosphorescent stripe for luminescing in red, at least one phosphorescent stripe for luminescing in green, and at least one phosphorescent stripe for luminescing in blue;

wherein said red phosphorescent stripes luminesce adjacent to said red components of said display pixels, said green phosphorescent stripes luminesce adjacent to said green components of said display pixels, and said blue phosphorescent stripes luminesce adjacent to said blue components of said display pixels; and further wherein said phosphorescent stripes are continuously energized during said liquid crystal display operation.

4. The system in accordance with claim 3 wherein said emitter plate includes gate electrodes and cathode electrodes, said gate electrodes of said emitter plate being coupled to a first voltage and said cathode electrodes being coupled to a second voltage.

5. A liquid crystal display apparatus comprising:

a liquid crystal display having an array of display pixels, and having a first, a second, and a third aperture switch per display pixel; and a backlight for generating light of a color to said first aperture switch, for generating light of a second color to said second aperture switch, and for generating light of a third color to said third aperture switch;

wherein said backlight includes a field emission device having an emitter plate coupled to an anode plate; said anode plate including at least on phosphorescent stripe for luminescing in red, at least one phosphorescent stripe for luminescing in green, and at least one phosphorescent stripe for luminescing in blue; and further wherein said anode plate is coupled to a power supply and said power supply continuously energizing all phosphorescent stripes.

6. The apparatus in accordance with claim 5 wherein said emitter plate includes gate electrodes and cathode electrodes, said gate electrodes of said emitter plate being coupled to a first voltage and said cathode electrodes being coupled to a second voltage.

7. A liquid crystal display apparatus comprising:

a liquid crystal display having an array of display pixels, and having a first, a second, and a third aperture switch per display pixel;

means for generating light of a first color to said first aperture switch;

means for generating light of a second color to said second aperture switch; and means for generating light of a third color to said third aperture switch;

wherein said light means includes a field emission device having an emitter plate coupled to an anode plate; said anode plate including at least one phosphorescent stripe for luminescing in red, at least one phosphorescent stripe for luminescing in green, and at least one phosphorescent stripe for luminescing in blue; and further wherein said anode plate is coupled to a power supply and said power supply continuously energizing all phosphorescent stripes.

8. The apparatus in accordance with claim 7 wherein said emitter plate includes gate electrodes and cathode electrodes, said gate electrodes of said emitter plate being coupled to a first voltage and said cathode electrodes being coupled to a second voltage.

* * * * *